United States Patent

[11] 3,618,766

| | | |
|---|---|---|
| [72] | Inventor | Edward F. Morey<br>Atlanta, Ga. |
| [21] | Appl. No. | 5,173 |
| [22] | Filed | Jan. 23, 1970 |
| [45] | Patented | Nov. 9, 1971 |
| [73] | Assignee | The Taulman Company<br>Atlanta, Ga. |

[54] WATER TREATMENT
8 Claims, 1 Drawing Fig.

[52] U.S. Cl. .................................................. 210/75,
210/96
[51] Int. Cl. ...................................................... B01d 37/02
[50] Field of Search ............................................ 210/75, 96,
193

[56] References Cited
UNITED STATES PATENTS

| 2,468,188 | 4/1949 | Frankenhoff................ | 210/96 X |
| 3,298,521 | 1/1967 | McKinlay..................... | 210/75 |
| 3,349,913 | 10/1967 | Schneider..................... | 210/193 X |
| 3,421,624 | 1/1969 | Boyd............................ | 210/96 |

*Primary Examiner*—Samih N. Zaharna
*Attorney*—Berman, Davidson and Berman

ABSTRACT: A method for precisely controlling the addition of filter aid chemicals to water treated in a high-rate filter apparatus, wherein turbidity measurements are simultaneously made of the water at an intermediate point in the filter bed and of the final filter effluent. The relationship of the turbidity measurements is used to constantly regulate the optimum addition of filter aid chemicals.

PATENTED NOV 9 1971 3,618,766
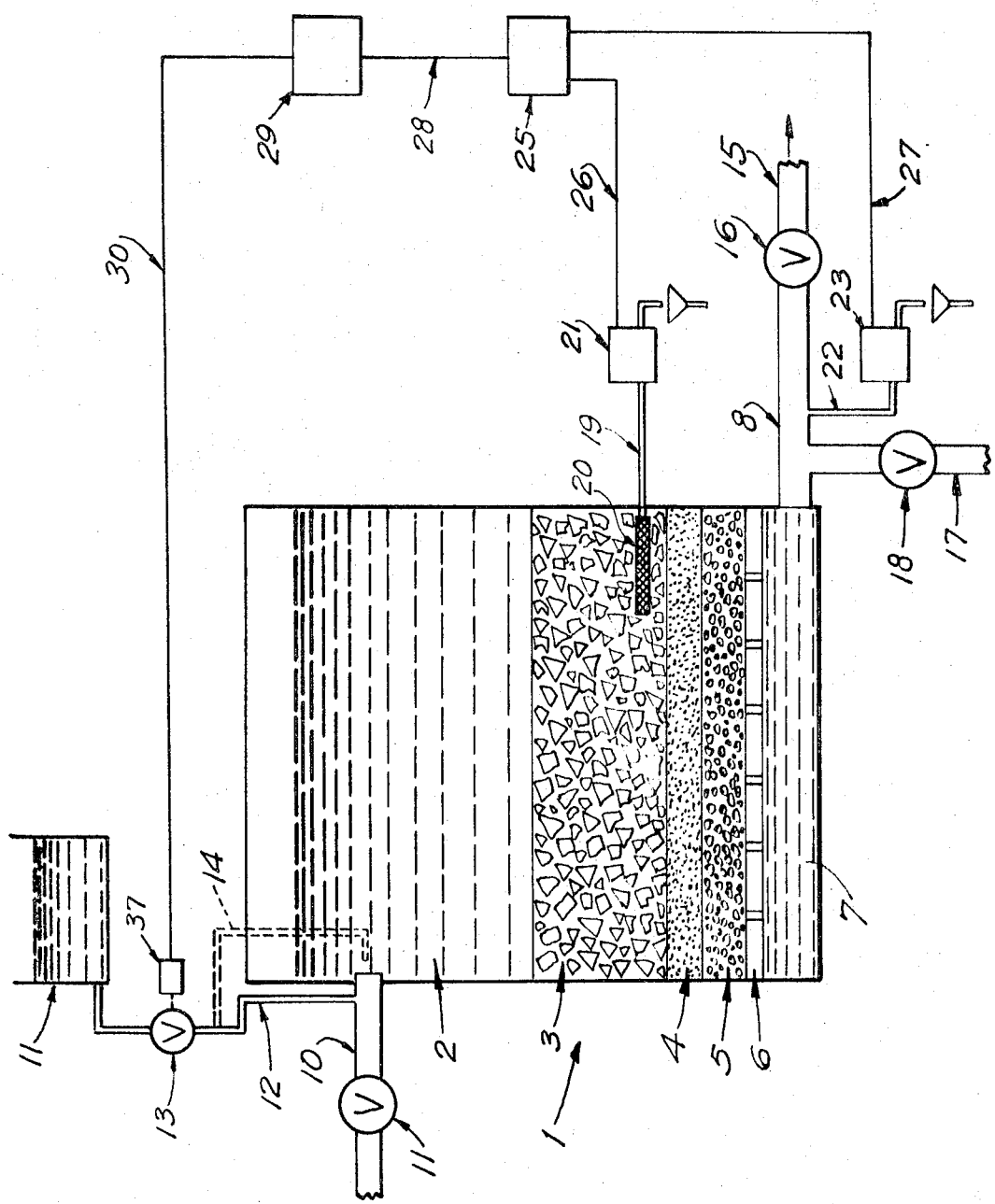
INVENTOR.
EDWARD F. MOREY,
BY
Berman, Davidson & Berman,
ATTORNEYS

WATER TREATMENT

The present invention relates to a novel method for the control of water treatment devices, and more specifically to an improved method for controlling the addition of filter aid chemicals to water treated in both single and multiple bed, high rate filter devices.

It is generally known that the efficiency and effectiveness of high-rate filters may be enhanced by the addition of filter aids or secondary coagulation aids. These filter aids generally comprise sticky, colloidal, organic compounds of relatively high molecular weight and which bear numerous hydrophilic substituents such as hydroxyl, amine carboxyl, or amide groups. These flocculation aids, when properly added to treatment water in amounts of about 0.001 to about 0.100 parts per million (p.p.m.) water treated, aid in the formation of a filterable agglomerate which may be efficiently removed by the particulate media of a typical filter.

The control of the amount of filter aid used in high-rate-filter system has heretofore presented many difficulties. When too much filter aid is added, there is a tendency for agglomerated particles to clog the topmost pores of the bed media. The adherent particles tend to cause unduly rapid buildup of head loss through the filter bed.

To date, most systems for controlling filter aid addition have involved measurement of the turbidity of the final filter effluent and subsequent adjustment of the filter aid concentration. Such methods, particularly in the case of multibed filters, have been found to be inadequate, wherein breakthrough of improperly filtered effluent from a coarse coal filter media into a fine sand media frequently occurs before proper adjustment can be made. This breakthrough leads to extremely rapid buildup of head loss in the fine sand media. When carried to extremes, breakthrough results in the contamination of the final filter effluent.

It is therefore an object of the present invention to provide an improved method for controlling the addition of filter aids to filter feed water.

It is another object to provide a method for operating high rate single and multibed filters in a manner which permits the optimum addition of filter aid to the water passing therethrough.

It is a further object to provide a method for adding filter aid to the feed water of a multibed-filtration system in a manner which minimizes the rate of head loss buildup and the likelihood of breakthrough of improperly filtered water.

These and still further objects of the present invention will become readily apparent to one skilled in the art from the following detailed description and drawing wherein the figure represents a schematic view of a typical multibed-filter system used in the practice of the present invention.

Broadly, the present invention comprises a method for controlling the addition of filter aid chemicals to a filtration system wherein:

1. The turbidity of water passing through the system is observed at a point intermediate through the filter media, and preferably substantially at the interface of a coarse and fine filter media of the filter bed in the case of a multibed filter;
2. The turbidity of the final filter effluent is observed;
3. The relationship of the turbidity at these points is established and maintained within acceptable limits by controlling the addition of filter-aid chemicals.

More specifically, it has been found that the addition of filter aid to a rapid-rate water-filtration system may be precisely controlled by observing the turbidity of water being processed in the system at both a point intermediate through the filter bed (at the interface point in a multibed filter) and at the final effluent point. Continuous turbidity readings taken at these points may be conveniently compared with each other so as to obtain a meaningful relationship in the form of a numerical index. One such relationship would be:

$$\frac{\text{Turbidity reading at intermediate point}}{\text{Turbidity reading of effluent}} = \text{Index}_{I/E}$$

from which the addition of filter aid may be controlled. In other words, the filter-aid chemical is added in that amount which will maintain the Index$_{I/E}$ within certain predetermined acceptable limits.

The presently described control system may be applied to or used in conjunction with both single and multibed-filter systems. When the filter system utilizes a single filtration bed, the bed may comprise a particulate filter media of one type or a mixture of various types. That is, the media may comprise a homogenous or heterogeneous filtration material. When multibed filters are used, the media is normally arranged in two or more layers of distinct materials.

While it is understood that both single and multibed-filtration systems may be used in the practice of the present invention, the following detailed description and drawing will emphasize the use of a multibed filter. The application of the present control method to a single bed filter is essentially the same as in the case of a multibed filter, however, the intermediate sampling of water is taken at any intermediate point (preferably from the top half) in the single filter bed since a distinct media interface does not exist.

In the types of multibed-filter systems generally contemplated herein the uppermost bed may typically comprise a finely divided coal having an average particle size of about 0.8 to 1.4 mm. The second bed generally comprises sand having an average particle size of about 0.3 to 0.5 mm. The function of the coal bed in a system which utilizes a filter-aid chemical, is to remove the great majority of the flocculated turbidity inducing particles. Sand beds are used to support the coal bed and to remove a relatively small proportion of the total initial contaminants of the filter feed water which are not removed in the coal bed. In other words, the general function of the sand bed is not to remove large quantities of turbidity inducing materials, but to "polish" the water.

A primary function of the present system when applied to multibed filters is to provide a means for controlling the addition of filter aid so as to insure sufficient aid is added to effectively flocculate and cause removal of the majority of the turbidity in the upper, i.e. typically coal, layer. The present system, when properly utilized, will control the addition of filter aid so as to minimize head loss and to prevent breakthrough of undesired nonfiltered components from the upper to lower portions of the filter bed, and ultimately, to prevent escape of poorly filtered water from the apparatus as final filter effluent.

To achieve this result, control apparatus such as that schematically illustrated in the drawing is utilized wherein a conventional multibed filter apparatus, generally 1 is shown in cross section. Multibed filter apparatus 1 comprises a container structure 2 which serves to support and confine the uppermost porous filter layer 3 which generally comprises particulate coal having an average particle size in the range of from about 0.8 to 1.4 mm. Positioned immediately below coarse media layer 3 is fine media layer 4 which generally comprises sand having an average particle size of about 0.3 to 0.5 mm. The sand layer in turn is supported within the structure 1 by a gravel layer 5. Gravel layer 5 in turn is supported by an under-drain system shown as 6. A filter effluent collection chamber 7 receives and collects effluent passing through the superimposed layers 3, 4 and 5. Leading from the effluent chamber 7, conduit 8 carries the final-filter effluent from the filter unit. Located above the filter media is unfiltered feed water conduit 10, the flow through which is controlled by valve 11. Branching from feed water conduit 10 is filter aid chemical addition conduit 12. Interposed between the conduit 12 and the feed water pipe 10 is flocculation aid control valve 13. Alternatively, chemical addition conduit 12 may discharge into filter feed water as shown by broken line 14, at termination of feed water conduit 10 inside the container structure 2.

Connected to the effluent conduit 8 is clear effluent conduit 15 through which flow is controlled by clear effluent conduit valve 16. Branching from effluent conduit 8 is backwash conduit 17, the flow through which is controlled by valve 18.

Interspaced between coarse media layer 3 and the fine media layer 4 substantially at the interface thereof, is interface monitoring conduit 19 which is provided with a strainer 20 to sample water passing through the system at the interface point. Conduit 19 leads to interface monitoring turbidity sensing cell 21.

When a single bed filter (not shown) is utilized, the monitoring conduit 19 and strainer 20 is placed at a point intermediate through the bed. Preferably, the location of the monitoring conduit 19 and strainer 20 in a single bed filter will be in the top half or three-quarters of the media column.

Leading from effluent conduit 8 is effluent monitoring conduit 22 which in turn is connected to effluent monitoring turbidity-sensing cell 23. Turbidity-sensing cells 21 and 23 are connected to a turbidimeter readout device depicted as 25 by means of wires 26 and 27.

The turbidity-sensing cells 21 and 23 are standard commercially available units which are used to detect the presence or absence of fine particles in a water stream. The turbidity-sensing cells 21 and 23 are interconnected with the turbidimeter readout 25 which provides a meaningful visual or electrical output. It is to be understood that the output from turbidimeter readout 25 may be in the form of individual readings from the respective turbidity-sensing cells, or the turbidimeter readout may be adapted to combine or integrate signals from the sensing cells 21 and 23 to provide a workable numerical index if desired.

In one preferred practice of the invention, the output of the turbidity readout device 25 is transmitted by way of wire 28 to automatic filter-aid chemical-controller device 29. The controller device 29 is connected by way of connector wire 30 to valve power operator 31. Valve power operator 31 which is operably connected to the filter-aid regulator valve 13 provides for automatic manipulation of the valve 13.

In operation, unfiltered process water enters the influent conduit 10 and is admixed with the required amount of filter-aid chemicals flowing through conduit 12 as controlled by valve 13. The precise amount of filter-aid chemicals will be added in quantities which are determined by means subsequently described. The process water containing the filter aid then enters the container structure 2 and flows downward through the coarse media bed 3. In the coarse media bed 3 the water is contacted with a media such as coal and a substantial proportion of the turbidity inducing materials are removed therefrom. Upon passing through the coarse media 3 the water then passes through the interface between coarse media 3 and fine media 4. At that point, a small sample of water is continuously removed by means of the strainer 20 and the monitoring conduit 19.

Subsequent to passing through the interface and into the fine media 4, the effluent then passes through the gravel bed 5, the under drain system 6 and from the apparatus by means of conduit 8. The flow of water from conduit 8 is controlled by means of valve 16. Also a sample portion of the water passing from conduit 8 is passed through effluent monitoring conduit 22 for sampling purposes. Valve 16 controls the flow of the final filtered effluent which is produced by the apparatus. Valve 18 may be used to control the flow of back flushing water which may be introduced through the bed by means of conduit 17.

Referring back to the interface-monitoring conduit 19, water passing therethrough is conducted to turbidity-sensing cell 21. Simultaneously, filtered effluent passing through monitoring conduit 22 is passed through turbidity-sensing cell 23. Thus it is seen that in the operation of the present device the turbidity of the water passing through the coarse media 3-fine media 4 interface, and the turbidity of the final effluent from the filter are simultaneously observed. The readings of the turbidity cells 21 and 23 are transmitted to the turbidimeter readout device 25. At this point the readings of the turbidity-sensing cells 21 and 23 may be divided into each other so as to obtain a numerical ratio of the turbidity of the water at the interface divided by the turbidity of the water passing from the system as final effluent. Since the turbidity of the final effluent is always less than the turbidity at the interface, that is the lower filter media will always serve to remove some additional turbidity, the ratio will always be in excess of 1.

In order to maintain the desired concentration of filter-aid chemical addition by means of valve 13, a desired numerical turbidity ratio is obtained from the readings of turbidity-sensing cell 21 and 23. This desired reading may be generally obtained by a trial and error method wherein small amounts of filter aid chemical are added to the raw water in incremental amounts which will provide the desired turbidity reading at the interface, i.e. turbidity-sensing cell 21, and at the final effluent sampling point, i.e. turbidity-sensing cell 23. Generally, the values selected will be those at which readings of turbidity cell 23 are the maximum acceptable for the effluent water. Likewise, since it is expected that the coarse media 3 will provide the majority of the turbidity removal, the reading of turbidity-sensing cell 21 will be the minimum acceptable commensurate with suitable buildup of head loss through the coarse media bed 3. For example, if it is found that on an arbitrary scale, the maximum turbidity acceptable of the final effluent is 3 as registered from turbidity-sensing cell 23, and if it is found that on the same arbitrary scale that the maximum reading at the interface should be 4 commensurate with acceptable minimum head loss buildup through the coarse media 3, the observed working ratio will be 4/3 or 1.33. Accordingly, the addition of filter aids as regulated by valve 13 will be that amount which will yield the desired working ratio of 1.33. This control of valve 13 may be done manually by observations, calculations, and manipulations made by an operator, or preferably the working of valve 13 may be automatically interconnected with the turbidimeter readout device 25 wherein appropriate limits are maintained by way of suitable automatic control means. One such automatic means is shown in the drawing, comprising wires 28 leading from turbidity readout device 25 to automatic controller device 29 which contains an integral set-point station, and wires 30 leading to valve-powered operator 31.

As indicated above, the flocculation aids utilized in relatively minor amounts in the practice of the present invention are generally described as colloidally dispersed organic polymers which contain numerous hydrophilic groups. Typically, filter-aid chemicals used in the present invention may include polysaccharides, polyacrylamides, carboxymethylcelluloses, alginates, carrageenins, gargum and other similar substances. These filter-aid chemicals are generally commercially available and sold under commercial trade names such as Separan, Magnifloc, Reten, Nalcolyte and Aquafloc. In generally preferred practice the flocculation aids are added in amounts of from about 0.001 to about 0.100 p.p.m. of the water treated.

In the operation of the present system, it is seen that when the desired numerical ratio may no longer be maintained, that is if the turbidity reading for the interface sample may no longer be maintained by proper addition of flocculation aid, the system has reached the point at which shutdown and backwashing should occur. It is found that by monitoring the water passing through the interface or intermediate point, the shutdown point may be precisely determined without undue breakthrough of agglomerated particles into the lower portions of the filter medium layer, and ultimately into the final effluent stream. Once the end point of the filter cycle has been attained by increasing the numerical ratio above the set limits, the backwashing cycle may be conveniently automatically induced by a signal from the turbidimeter read out 25 to appropriate automatically actuated valves (now shown).

Thus, it is seen that the present system provides a means for both precisely controlling the amount of flocculation aid chemical, and also for precisely determining the point at which a single or multibed-filter system should be shutdown and backwashed.

What is claimed is:

1. In a method for the treatment of water for the turbidity thereof which comprises passing water through a filter having a particulate filter media bed, and adding a filter aid to said water to aid the removal of turbidity inducing particles by said media bed, the improvement which comprises, during operation of the filter:
   a. determining the turbidity of water passing at a point intermediate through said media bed,
   b. determining the turbidity of final-filter effluent passing from said media bed,
   c. and maintaining the relationship of the turbidity at the intermediate point to the turbidity of the effluent substantially constant within predetermined limits by addition of the filter aid to said water.

2. The method of claim 1 wherein said media bed comprises an upper coarse media bed supported by a lower media bed supported by a lower fine media bed and said observation (a) is taken substantially at the interface of said coarse media bed and fine media bed.

3. The method of claim 2 wherein said coarse media comprises coal having a particle size of from about 0.8 to 1.4 mm.

4. The method of claim 2 wherein said fine media is sand having an average particle size of from about 0.3 to 0.5 mm.

5. The method of claim 1 wherein said process is conducted substantially continuously.

6. The method of claim 1 wherein said process is continued until said relationship is no longer maintainable and said system is back flushed.

7. The method of claim 1 wherein said aid is added substantially continuously in amounts ranging from about 0.001 to about 0.100 p.p.m. of water treated.

8. The method of claim 6 wherein said aid is Separan.

* * * * *